(12) United States Patent
Yan et al.

(10) Patent No.: US 12,498,595 B2
(45) Date of Patent: Dec. 16, 2025

(54) DISPLAY PANEL AND DISPLAY DEVICE (71) Applicants: Chengdu BOE Optoelectronics Technology Co., Ltd., Sichuan (CN); BOE Technology Group Co., Ltd., Beijing (CN)

(72) Inventors: Qingqing Yan, Beijing (CN); Xiaomin Yuan, Beijing (CN); Erjin Zhao, Beijing (CN); Ge Wang, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 561 days.

(21) Appl. No.: 17/915,168

(22) PCT Filed: Nov. 15, 2021

(86) PCT No.: PCT/CN2021/130641
§ 371 (c)(1),
(2) Date: Sep. 28, 2022

(87) PCT Pub. No.: WO2022/156327
PCT Pub. Date: Jul. 28, 2022

(65) Prior Publication Data
US 2023/0122614 A1    Apr. 20, 2023

(30) Foreign Application Priority Data
Jan. 25, 2021   (CN) ......................... 202110095787.4

(51) Int. Cl.
G02F 1/03    (2006.01)
G02B 5/30    (2006.01)

(52) U.S. Cl.
CPC .......... *G02F 1/0311* (2013.01); *G02B 5/3083* (2013.01)

(58) Field of Classification Search
CPC ... G02F 1/0311; G02B 5/3033; G02B 5/3083; H10K 59/00; H10K 59/10
See application file for complete search history.

(56) References Cited

U.S. PATENT DOCUMENTS

| | | |
|---|---|---|
| 10,222,834 B2 | 3/2019 | Choi et al. |
| 10,401,675 B2 | 9/2019 | Lee et al. |
| (Continued) | | |

FOREIGN PATENT DOCUMENTS

| | | |
|---|---|---|
| CN | 101454699 A | 6/2009 |
| CN | 101454699 B | 11/2010 |
| (Continued) | | |

OTHER PUBLICATIONS

Andreas G. Andreou et al., Polarization Imaging: Principles and Integrated Polarimeters, 2 IEEE Sensors Journal 566-576 (2002). (Year: 2002).*

(Continued)

*Primary Examiner* — Jennifer D. Carruth
(74) *Attorney, Agent, or Firm* — XSENSUS LLP (57) ABSTRACT

A display panel comprises a display substrate, a phase difference layer and a polarizer. The phase difference layer is disposed on a display side of the display substrate. The polarizer is disposed on one side of the phase difference layer which is away from the display substrate. The direction of the absorption axis of the polarizer is parallel to or perpendicular to the stretching direction of the polarizer, and the included angle between the absorption axis of the polarizer and the optical axis of the phase difference layer is not equal to 0° or 90°.

18 Claims, 5 Drawing Sheets (56) References Cited

U.S. PATENT DOCUMENTS

| | | | | |
|---|---|---|---|---|
| 2005/0117217 | A1* | 6/2005 | Yamaoka | G02B 5/3083 |
| | | | | 359/485.03 |
| 2007/0279741 | A1* | 12/2007 | Yoshioka | G02B 5/0242 |
| | | | | 359/489.07 |
| 2017/0262022 | A1 | 9/2017 | Choi et al. | |
| 2018/0149785 | A1 | 5/2018 | Lee et al. | |
| 2019/0235148 | A1* | 8/2019 | Hasegawa | H05B 33/02 |
| 2019/0384111 | A1 | 12/2019 | Lee et al. | |
| 2020/0142255 | A1* | 5/2020 | Kitagawa | H05B 33/02 |
| 2021/0098544 | A1* | 4/2021 | Ma | B32B 37/15 |
| 2021/0260851 | A1* | 8/2021 | Tomohisa | B32B 7/023 |
| 2021/0311238 | A1* | 10/2021 | Lee | G02F 1/133638 |
| 2021/0311574 | A1* | 10/2021 | Niu | G02B 5/3025 |

FOREIGN PATENT DOCUMENTS

| | | | | | |
|---|---|---|---|---|---|
| CN | 108122488 | A | | 6/2018 | |
| CN | 109683226 | A | * | 4/2019 | G02B 5/3033 |
| CN | 110298315 | A | | 10/2019 | |
| CN | 111443828 | A | * | 7/2020 | G02B 5/3025 |
| CN | 112864208 | A | | 5/2021 | |
| CN | 110298315 | B | | 7/2021 | |
| JP | 2007-322778 | A | | 12/2007 | |
| JP | 2019204111 | A | * | 11/2019 | B32B 7/023 |
| KR | 2009-0027225 | A | | 3/2009 | |
| KR | 101397301 | B1 | | 5/2014 | |
| KR | 20160055431 | A | * | 5/2016 | |
| TW | 200811489 | A | | 3/2008 | |
| WO | 2007/142037 | A1 | | 12/2007 | |

OTHER PUBLICATIONS

Jun H. Souk et al., A Practical Approach to Processing Flexible Displays, 18 Journal of the Society for Information Display 258-265 (2010). (Year: 2010).*

D. Lu et al, Liquid Optically Clear Adhesives for Display Applications, 2012, pp. 438-441 [online]. [retrieved Mar. 14, 2024], retrieved from the Internet <URL: https://ieeexplore.ieee.org/stamp/stamp.jsp?tp=&arnumber=6474653>. (Year: 2012).*

International Search Report and Written Opinion mailed on Feb. 10, 2022, in corresponding PCT/CN2021/130641, 6 pages.

* cited by examiner

FIG. 12

DISPLAY PANEL AND DISPLAY DEVICE

CROSS-REFERENCE TO RELATED APPLICATIONS

The present application is the U.S. national phase application of PCT Application No. PCT/CN2021/130641, filed Nov. 15, 2021, which claims priority to a Chinese patent application No. 202110095787.4, filed on Jan. 25, 2021 and entitled "Display Panel and Display Device", the entire contents of each of which are incorporated herein by reference in their entirety.

TECHNICAL FIELD

The present disclosure relates to the field of display technology, and in particular, to a display panel and a display device including the display panel.

BACKGROUND

With the rapid development of OLED (organic light-emitting diode) display technology, customers have more and more stringent requirements on the hue of mobile phones when the screen is off. They not only have requirements on the integrated black effect before the reliability test, but also have limitations on the hue uniformity after the reliability test, so as to be applied to FMLOC (flexible multi-layer on cell) products. FMLOC refers to a process in which a metal grid electrode layer is produced on the packaging substrate of the display panel, so as to perform touch control without external TSP (touch sensor panel). This process can reduce the thickness of the screen, which is conducive to folding; in addition, there is no fit tolerance, which can reduce the width of the frame.

At present, a phenomenon of uneven bile may occur in the existing display panel, and the ambient light has a great influence on the display effect. Especially under strong ambient light, it is difficult to see the display screen clearly.

The above information disclosed in this section is only for understanding the background of the disclosure and therefore may contain information not belonging to the prior art that is already known to those skilled in the art.

SUMMARY

The present disclosure is directed to overcome the above-mentioned shortcomings of the related art, and to provide a display panel with uniform hue and a display device including the display panel.

According, to an aspect of the present disclosure, a display panel is provided, including:
  a display substrate;
  a retardation layer, provided on a display side of the display substrate; and
  a polarizer, provided on a side of the retardation layer away from the display substrate, where a direction of an absorption axis of the polarizer is parallel or perpendicular to a stretching direction of the polarizer, and an included angle between the absorption axis of the polarizer and an optical axis of the retardation layer is not equal to 0° or 90°.

In some embodiments of the disclosure, the retardation layer includes a ¼ λ retardation film.

In some embodiments of the disclosure, the included angle between the optical axis of the ¼ λ retardation film and the absorption axis of the polarizer is 45°.

In some embodiments of the disclosure, the retardation layer further includes a ½ λ retardation film, and the ½ λ retardation film is provided between the ¼ λ retardation film and the polarizer.

In some embodiments of the disclosure, an included angle between an optical axis of the ¼ λ retardation film and the absorption axis of the polarizer is θ1, and an included angle between an optical axis of the ½ λ retardation film and the absorption axis of the polarizer is θ2; where θ1 is greater than or equal to 10° and less than or equal to 20° or θ1 is greater than or equal to 70° and less than 90°, and correspondingly, θ2 is greater than or equal to 70° and less than 90° or θ2 is greater than or equal to 10° and less than or equal to 20°.

In some embodiments of the disclosure, θ1 is 15°, and θ2 is 75°; or θ1 is 75°, and θ2 is 15°.

In some embodiments of the disclosure, the display panel further includes:
  a third adhesive layer, provided on a side of the polarizer away from the display substrate; and
  a transparent cover plate, provided on a side of the third adhesive layer away from the display substrate.

In some embodiments of the disclosure, a thickness of the third adhesive layer is greater than or equal to 0.15 mm.

In some embodiments of the disclosure, the transparent cover plate includes:
  a flat portion; and
  a bending portion, connected to two opposite side edges of the flat portion and smoothly transitioning with the flat portion.

In some embodiments of the disclosure, the third adhesive layer, the polarizer and the retardation layer are sequentially stacked on a side of the flat portion and an inside of the bending portion.

In some embodiments of the disclosure, the polarizer includes:
  a polarizing layer, provided on a side of the retardation layer away from the display substrate; and
  a second protective layer, provided on a side of the polarizing layer away from the display substrate.

In some embodiments of the disclosure, the polarizer further includes:
  a first protective layer, provided between the retardation layer and the polarizing layer.

In some embodiments of the disclosure, the display substrate includes a thin film transistor array layer and a light emitting functional layer; and the light emitting functional layer includes a first electrode, a light emitting layer and a second electrode.

According to another aspect of the disclosure, a display device is provided, including the display panel according to any embodiments as described above.

In the display panel and the display device according to the present disclosure, a retardation layer is provided on the display side of the display substrate, a polarizer is provided on a side of the retardation layer away from the display substrate, the direction of the absorption axis of the polarizer is parallel or perpendicular to the stretching direction thereof, and the included angle between the absorption axis oldie polarizer and the optical axis of the retardation layer is not equal to 0° and 90°. On the one hand, due to the large shrinkage force in the stretching direction of the polarizer the included angle between the optical axis of the retardation layer and the stretching direction is not equal to 0° and 90° in the display panel, so that the included angle between the shrinking direction and the optical axis at anywhere of the retardation layer is not equal to 0° and 90°. In addition, at other positions of the polarizer, the shrinking force thereof has its component reduced in the optical axis direction of the retardation layer. Accordingly, the influence of shrinking force on the optical axis of the retardation layer is relatively uniform, thereby alleviating the phenomenon of uneven hue. On the other hand, by providing the polarizer and the retardation layer, the ambient light can be prevented from being reflected to the observer, thereby reducing the influence of ambient light on the display effect and improving the display effect.

It is to be understood that the foregoing general description and the following detailed description are exemplary and explanatory only and are not restrictive of the present disclosure.

BRIEF DESCRIPTION OF THE DRAWINGS

The accompanying, drawings, which are incorporated in and constitute a part of this specification, illustrate embodiments consistent with the disclosure and together with the description serve to explain the principles of the disclosure. Obviously, the drawings in the following description are only some embodiments of the present disclosure, and for those of ordinary skill in the art, other drawings can also be obtained from these drawings without creative effort.

Description of reference numbers are given as follows.
1. transparent cover plate; 11. flat portion; 12. bending portion; 121. first bending surface; 122. second bending surface; 13. extending flat portion;
2. display substrate;
3. retardation layer; 31. ¼λ retardation film; 32. ½ retardation film;
4. polarizer; 41. first protective layer; 42. polarizing layer; 43. second protective layer;
51. first adhesive layer; 52. second adhesive layer; 53. third adhesive layer;
6. backplane.

DETAILED DESCRIPTION

Exemplary embodiments will now be described more fully with reference to the accompanying drawings. Exemplary embodiments, however, can be embodied in various forms and should not be construed as hunted to the embodiments set forth herein. Instead, these embodiments are provided so that this disclosure will be thorough and complete, and will fully convey the concept of exemplary embodiments to those skilled in the art. The same reference numerals in the drawings denote the same or similar structures, and thus their detailed descriptions will be omitted. Furthermore, the drawings are merely schematic illustrations of the present disclosure and are not necessarily drawn to scale.

Although relative terms such as "on/above" and "under/below" are used in this specification to describe the relative relationship of one component as illustrated to another component, these terms are used in this specification only for convenience, such as according to the direction of the example as described. It should be understood that if the device as illustrated is turned upside down, the components described as "on/above" will become the components as "under/below". When a certain structure is "on/above" another structure, it may mean that the certain structure is integrally formed on the another structure, or that the certain structure is "directly" provided on the another structure, or that the certain structure is "indirectly" provided on the another structure through still another structure.

The terms "a", "an", "the", "said" and "at least one" are used to indicate the presence of one or more elements/components/and the terms "include" and "have" are used to indicate an open-ended inclusion and means that additional elements/components/and the like may be present in addition to the elements/components/and the like as listed. The terms "first", "second", "third" and the like, are only used as a marker, without limiting the number of related objects.

In the related art, due to the process, the polarizing layer (PVA, polyvinyl alcohol) of the polarizer used is relatively thick. The thicker the polarizing layer, the easier it is to shrink under the condition of reliability test. The shrinkage of the polarizing layer leads to stretching of the retardation layer and, further, causes uneven hue of the display panel after the reliability test, thereby affecting the black effect of the mobile phone. The shrinkage of the polarizing layer is an inherent property of the stretchable-type polarizing layer. Thinning the polarizing layer can reduce the shrinkage phenomenon, but another phenomenon of color fading (i.e., the failure of the polarizing layer) at the rear edge is prone to occur on FMLOC products after the reliability test.

Figure 1:
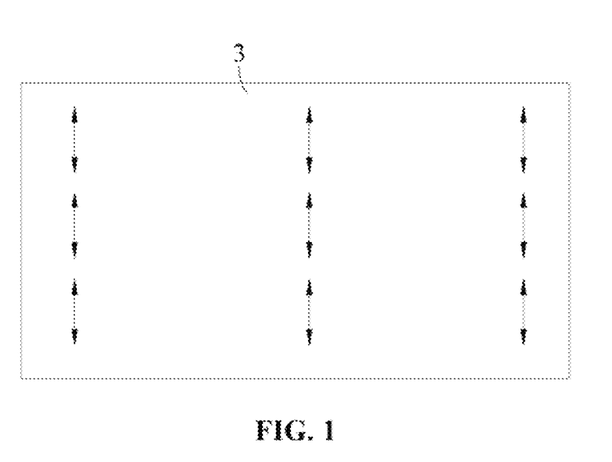
FIG. 1 is a schematic diagram illustrating the optical axis distribution of the retardation layer in the related art.
Figure 2:
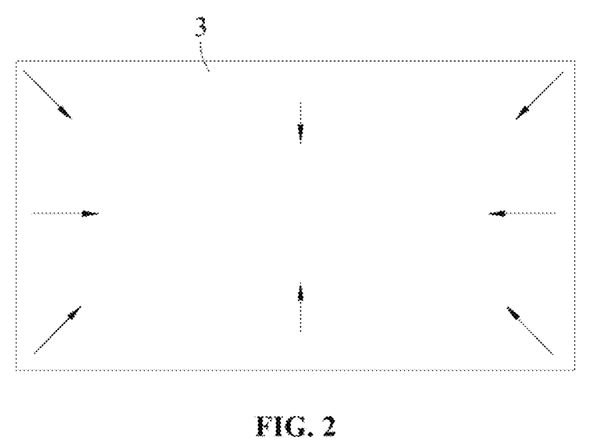
FIG. 2 is a schematic diagram illustrating the distribution of the stretching force received by the retardation layer in FIG. 1.
Figure 3:
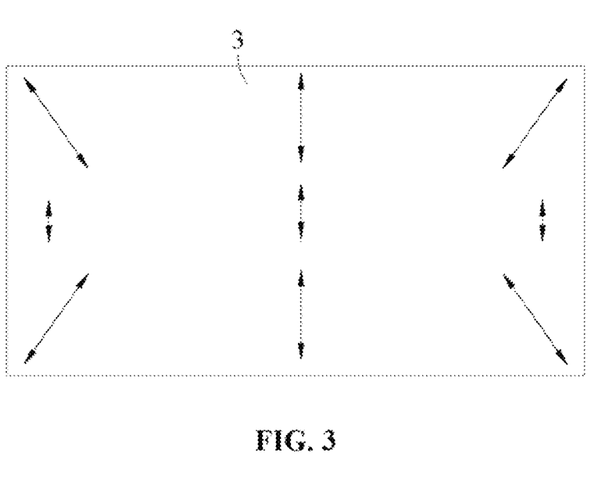
FIG. 3 is a schematic diagram illustrating the optical axis distribution of the retardation layer in FIG. 1 after receiving the stretching force.
Figure 4:
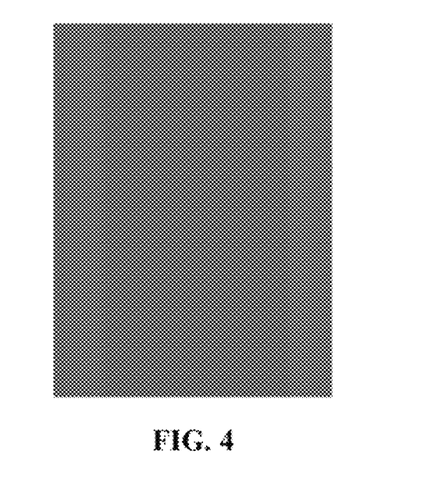
FIG. 4 is a schematic diagram illustrating the display effect of the display panel including the retardation layer in FIG. 3.

Referring to FIG. 1, which is a schematic diagram illustrating the optical axis distribution of the retardation layer 3, the arrows in the drawing indicate the direction of the optical axis in the retardation layer 3, and the directions of the optical axis in the retardation layers 3 in the drawing are consistent and uniformly arranged. Referring to FIG. 2, which is a schematic diagram illustrating the distribution of the stretching force received by the retardation layer 3, the arrows in the drawing indicate the magnitude and direction of the stretching force received by the retardation layer 3, and the stretching force received at the corner of the retardation layer 3 in the drawing is the greatest. Referring to FIG. 3, which is a schematic diagram illustrating the optical axis distribution of the retardation layer 3 after receiving the stretching force, the arrows in the drawing indicate the directions of the optical axis in the retardation layer 3, and the directions of the optical axis in the retardation layer 3 in the drawing are inconsistent and unevenly provided. With reference to FIG. 1 to FIG. 3, when the shrinking direction is perpendicular or parallel to the optical axis, the shrinking force has little effect on the optical axis, that is, the included angle between the shrinking direction and the direction of the optical axis in the retardation layer 3 is still 0° or 90°. When the shrinking direction is not perpendicular or parallel to the direction of the optical axis, the shrinking force has an influence on the direction of the optical axis, that is, an included angle is present between the shrinking direction and the direction of the optical axis in the retardation layer 3, and the included angle is not equal to 0° or 90°, thereby affecting the display effect of the display panel. Referring to FIG. 4, which is a schematic diagram illustrating the display effect of the display panel in the related art, where the display panel includes the retardation layer 3 shown in FIG. 3, uneven hue occurs between two side edges and the middle part of the display panel after the light passes through the retardation layer 3.

Figure 5:
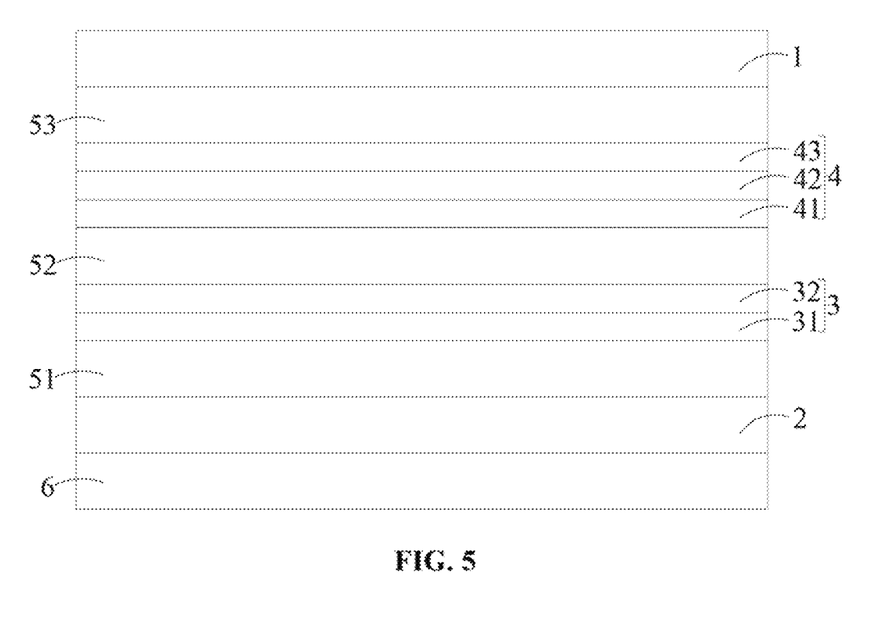
FIG. 5 is a schematic structural diagram of the display panel according to some embodiments of the present disclosure.
Figure 6:
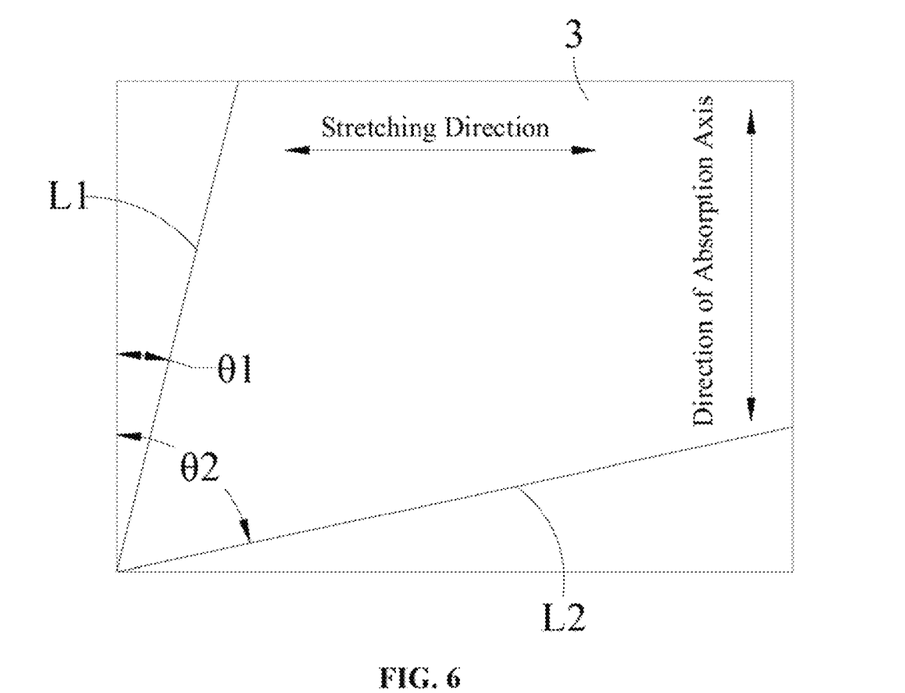
FIG. 6 is a schematic diagram illustrating the included angle of the optical axis in the retardation layer of FIG. 5.

Some embodiments of the present disclosure provide a display panel, as shown in FIG. 5 and FIG. 6, which are schematic structural diagrams of the display panel according to some embodiments of the present disclosure. The display panel may include a display substrate 2, a retardation layer 3 and a polarizer 4. The retardation layer 3 is provided on a display side of the display substrate 2; the polarizer 4 is provided on a side of the retardation layer 3 away from the display substrate 2, a direction of an absorption axis of the polarizer 4 is parallel or perpendicular to a stretching direction thereof, and an included angle between the absorption axis of the polarizer 4 and an optical axis of the retardation layer 3 is not equal to 0° or 90°.

In the display panel and the display device of the present disclosure, since the shrinkage three of the polarizer 4 in the stretching direction is relatively large, the corners of the polarizer 4 are affected by the shrinkage rate in the stretching direction and the shrinkage rate in the direction perpendicular to the stretching direction. Accordingly, the shrinkage rate at the corner is the largest and the shrinking direction forms a certain angle with the stretching direction, so the stretching, force at the corner of the retardation layer 3 is relatively large. In the display panel, the included angle between the optical axis of the retardation layer 3 and the stretching direction is not equal to 0° and 90°, so that at the corner with the largest shrinkage rate, the included angle between the optical axis of the retardation layer 3 and the shrinking direction decreases. At the other positions, the shrinkage force of the polarizer 4 has a reduced component in the direction of the optical axis of the retardation layer 3, so that the influence of shrinking force on the optical axis of the retardation layer 3 is relatively uniform, thereby alleviating the phenomenon of uneven hue. On the other hand, by providing the polarizer 4 and the retardation layer 3, the ambient light can be prevented from being reflected to the observer, thereby reducing the influence of ambient light on the display effect and improving the display effect.

It should be noted that the "perpendicular" mentioned in the exemplary embodiments of the present disclosure is not limited as being completely perpendicular, but should be considered as having an error with an error range of ±5°. In other words, when it is described that two objects are perpendicular to each other, an included angle therebetween may be greater than or equal to 85° and less than or equal to 95°.

In some embodiments, the display panel may further include a backplane 6, and a display substrate 2 is provided on one side of the backplane 6, and the display substrate 2 may include a thin film transistor array layer and a light-emitting functional layer. The thin film transistor array layer is provided on one side of the backplane 6, and the light-emitting functional layer is provided on one side of the thin film transistor array away from the backplane 6. The light-emitting functional layer may include a first electrode, a light-emitting layer, and a second electrode that are stacked in sequence. In the light-emitting functional layer, the first electrode is an anode, the second electrode is a cathode, and the light-emitting layer includes a hole injection layer, a hole transport layer, a light-emitting layer, an electron transport layer, an electron injection layer, and the like. The thin film transistor array layer drives the light emitting functional layer to emit light. The light-emitting functional layer emits light toward the transparent cover plate 1. The light of the light-emitting functional layer is emitted through the retardation layer 3, the polarizer 4 and the transparent cover plate 1. In some embodiments, the display substrate 2 may further include a fingerprint recognition function layer, a touch function layer, and the like.

In order to improve the injection efficiency of holes, the anode may be made of materials with a work function being as great as possible, and a common material is ITO (indium tin oxide or tin-doped indium oxide). For material selection of the cathode, the lower the work function thereof, the lower the potential barrier between the organic material and the cathode, the easier the electron injection, and the higher the luminous efficiency. At present, the commonly used cathode material is Mg—Ag (magnesium-silver) alloy, but it is a metal material, thereby making it easy to reflect the external ambient light, resulting in a greatly reduced contrast observed by the user.

In some embodiments, a first adhesive layer 51 is provided on one side of the display substrate 2 away from the backplane 6, and the material of the first adhesive layer 51 may be PSA (pressure sensitive adhesive), which is a kind of adhesives that are sensitive to pressure. In some embodiments, the material of the first adhesive layer 51 may also be optical adhesive such as OCA (optically clear adhesive).

The retardation layer 3 is provided on one side of the first adhesive layer 51 away from the backplane 6, and the retardation layer 3 may include a ¼ λ retardation film 31 and a ½ λ retardation film 32. The wavelength range of ambient light in nature has a relatively wide coverage, and the conventional ¼ λ retardation film 31 may generally only correspond to a single wavelength. In order to achieve an ideal compensation effect over wide wavelength, it is proposed to use more than two retardation films for additional compensation. For example, the ½ λ retardation film 32 is made of a material with little difference in refraction rate distribution, combined with the ¼ λ retardation film 31 with normal distribution of narrow band, and the ½λ retardation film 32 is provided on one side of the ¼ k retardation film 31 away from the display substrate 2. In other words, the ¼ k retardation film 31 is provided between the ½ λ retardation film 32 and the display substrate 2, a broadband coverage in the visible light band can be thus achieved. Desirable blackness can be achieved by the stacking of different retardation films, with only the display of the ¼ λ retardation film 31 being slightly bluish.

A second adhesive layer 52 is provided on one side of the retardation layer 3 away from the backplane 6. The material of the second adhesive layer 52 may be PSA. In some embodiment, the material of the first adhesive layer 51 may also be optical adhesive such as OCA. The thickness of the second adhesive layer 52 is about 25 microns.

The polarizer 4 is provided on one side of the second adhesive layer 52 away from the backplane 6, and the polarizer 4 is a linear polarizer. The polarizer 4 may include a first protective layer 41, a polarizing layer 42 and a second protective layer 43, where the first protective layer 41 is provided on one side of the second adhesive layer 52 away from the display substrate 2; the polarizing layer 42 is provided on one side of the first protective layer 41 away from the display substrate 2; and the second protective layer 43 is provided on one side of the polarizing layer 42 away from the display substrate 2. The material of the first protective layer 41 and the second protective layer 43 may be TAC (triacetate cellulose). The first protective layer 41 and the second protective layer 43 are used for supporting, protecting the polarizing layer 42 and preventing retraction thereof. The thicknesses of the first protective layer 41 and the second protective layer 43 are both greater than or equal to 25 microns and less than or equal to 40 microns. In some embodiments, the thinner the first protective layer 41 and the second protective layer 43, the better the bending of the display panel. The material of the polarizing layer 42 may be PVA. The polarizing layer 42 is a polarizing mechanism functional layer, and its thickness is greater than or equal to 7 microns and less than or equal to 12 microns.

In some other embodiments of the disclosure, the polarizer 4 may include the polarizing layer 42 and the second protective layer 43, that is, the polarizer 4 may not include the first protective layer 41, and the polarizing layer 42 may be directly bonded to one side of the second adhesive layer 52 away from the display substrate 2.

In some embodiments, as shown in FIG. 6, an included angle between an optical axis L1 of the ¼ λ retardation film 31 and the absorption axis of the polarizer 4 is θ1, and an included angle between an optical axis L2 of the ½ λ retardation film 32 and the absorption axis of the polarizer 4 is θ2; where θ1 is greater than or equal to 10° and less than or equal to 20° and θ2 is greater than or equal to 70° and less than 90°, or θ1 is greater than or equal to 70° and less than 90°, and θ2 is greater than or equal to 10° and less than or equal to 20°.

For example, θ1 is 15°, and θ2 is 75°; or θ1 is 75°, and θ2 is 15°.

When the linear polarizer 4 is combined with the ½ λ retardation film 32 and the ¼ λ retardation film 31, the natural light is converted into linearly polarized light after passing through a surface layer of the polarizer 4, and the polarization direction of the linearly polarized light is the perpendicular to the absorption axis of the polarizer 4. After the linearly polarized light passes through the ½ λ retardation film 32, a phase difference of π may be generated between the electric vector and the magnetic vector thereof, but it is still linearly polarized light, and the polarization direction is rotated by 180°. After the linearly polarized light passes through the ¼ λ retardation film 31, a phase difference of π/2 is generated between the electric vector and the magnetic vector thereof, and the linearly polarized light is converted into a right-handed (or left-handed) circularly polarized light. The right-handed (or left-handed) circularly polarized light is converted into a left-handed (or right-handed) circularly polarized light after being reflected by the cathode metal electrode of the display substrate 2. After the left-handed (or right-handed) circularly polarized light passes through the ¼ λ retardation film 31 again, a phase difference of π/2 is generated again between the electric vector and the magnetic vector thereof, and it may be converted into a linearly polarized light. The polarization direction of the linearly polarized light is parallel to the direction of the absorption axis of the polarizer 4. After polarized light passes through the ½ λ retardation film 32 again, a phase difference of π may be generated again between the electric vector and the magnetic. vector thereof, but it is still linearly polarized light; and the polarization direction is rotated by 180°, but is still parallel to the direction of the absorption axis of the polarizer 4. So the polarized light is absorbed by the polarizer 4, thereby preventing the reflected light from entering the human eye, reducing the reflection effect of the cathode metal electrode of the display substrate 2, and improving the contrast ratio of the OLED display.

In some other embodiments of the disclosure, the retardation layer 3 may include only the ¼ λ retardation film 31 without providing the ½ λ retardation film 32. At this time, the included angle between the optical axis of the ¼ λ retardation film 31 and the absorption axis of the polarizer 4 is about 45°. In some embodiments, the included angle between the direction of the absorption axis of the polarizer 4 and the optical axis of the retardation layer 3 is not limited to the above description. For example, the included angle between the direction of the absorption axis of the polarizer 4 and the optical axis of the retardation layer 3 may also be 30°, 60°, 80°, and the like, as long as it is not equal to 0° and 90°. When the included angle between the direction of the absorption axis of the polarizer 4 and the optical axis of the retardation layer 3 is equal to 0°, the light may be completely absorbed and cannot pass therethrough. When the included angle between the direction of the absorption axis of the polarizer 4 and the optical axis of the retardation layer 3 is equal to 90°, all the light rays may pass through and cannot form the circularly polarized light.

When the polarizer and the ¼ λ retardation film 31 are combined, the external ambient light passes through the polarizer 4 to form a first linearly polarized light. The first linearly polarized light is converted to a left circularly polarized light or a right circularly polarized light after passing through the ¼ λ retardation film 31. After the left circularly polarized light or the right circularly polarized light is reflected by the cathode metal electrode of the display substrate 2, it is rotated by 180 to become a right circularly polarized light or a left circularly polarized light. After the right circularly polarized light or left circularly polarized light passes through the ¼ λ retardation film 31, it is converted, into a second polarized light. The polarization direction of the second polarized light is perpendicular to the polarization direction of the first polarized light; and the second polarized light cannot pass through the polarizer 4 and cannot be emitted. Based on the above steps, the external ambient light is blocked in the display panel, thereby greatly improving the contrast ratio of the display panel, so that the screen content can be clearly seen even under strong sunlight.

Figure 7:
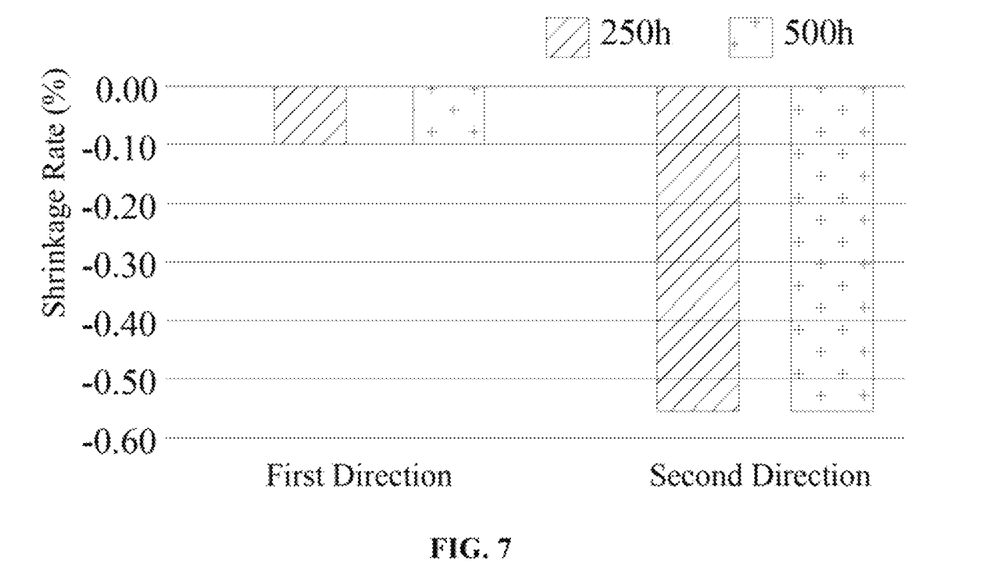
FIG. 7 to FIG. 9 are schematic diagrams of the shrinkage rate test in two directions after the reliability test of the polarizer in different environments.
Figure 8:
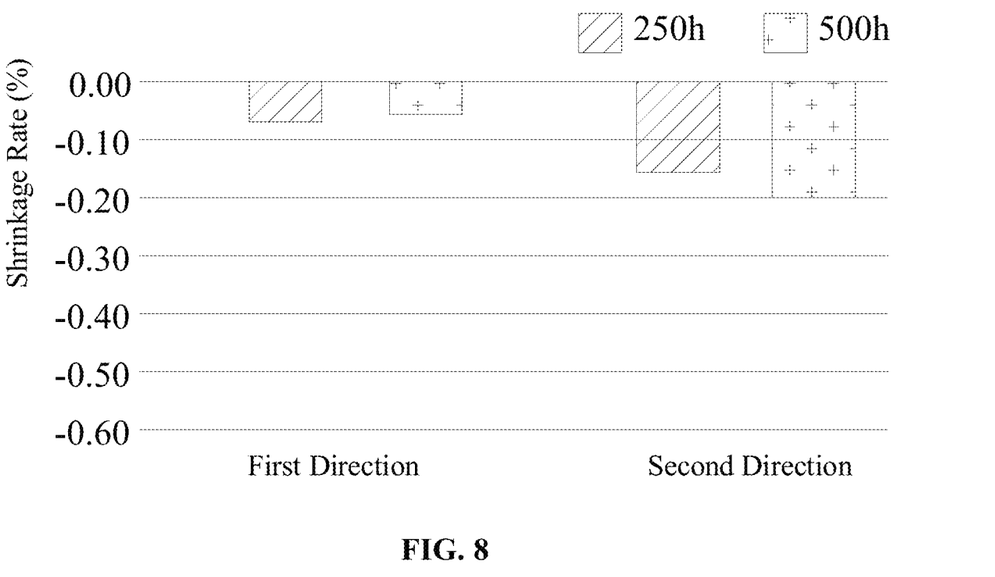
Figure 9:
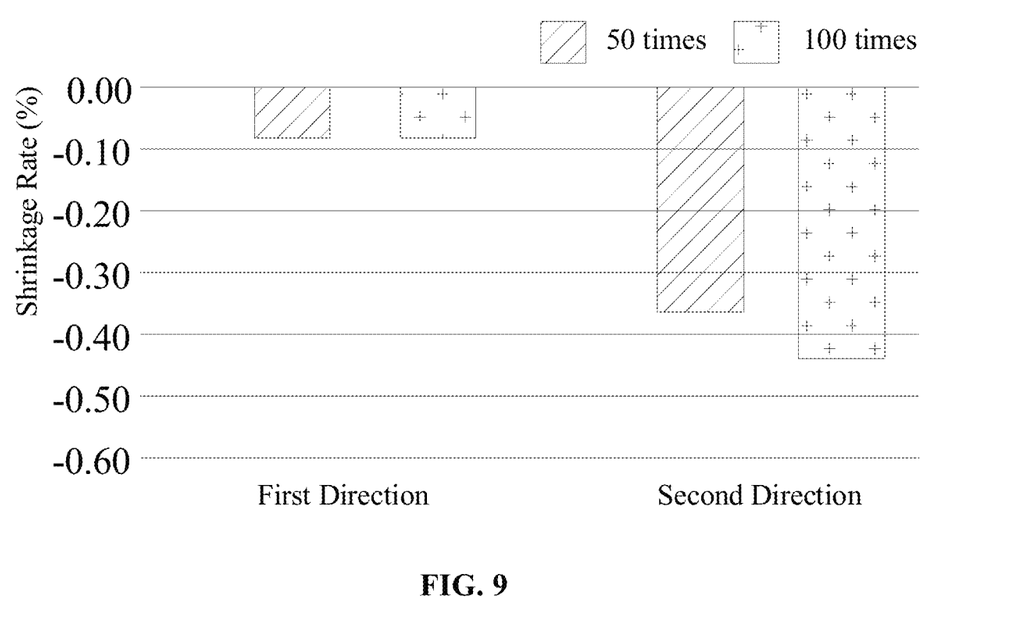

Referring to FIG. 7 to FIG. 9, schematic diagrams of the shrinkage rate test in two directions after the reliability test of the polarizer in different environments are shown. In FIG. 7, in an environment with a temperature of about 85° C., after a reliability test of about 250 hours, the shrinkage rate of the polarizer 4 in both the first direction and the second direction is about −0.1; in an environment with a temperature of about 85° C., after a reliability test of about 500 hours, the shrinkage rate of the polarizer 4 in both the first direction and the second direction is about −0.56. In FIG. 8, in an environment with a temperature of about 60° C. and a humidity of about 90%, after a reliability test of about 250 hours, the shrinkage rate of the polarizer 4 in the first direction is about −0.07, and the shrinkage rate in the second direction is about −0.16; in an environment with a temperature of about 60° C. and a humidity of about 90%, after a reliability test of about 500 hours, the shrinkage rate of the polarizer 4 in the first direction is about −0.06, and the shrinkage rate in the second direction is about −0.20. In FIG.

9, after about 50 times of temperature shock reliability test, the shrinkage rate of the polarizer 4 in the first direction is about −0.08, and the shrinkage rate in the second direction is about −0.37; after about 100 times of temperature shock reliability test, the shrinkage rate of the polarizer 4 in the first direction is about −0.08, and the shrinkage rate in the second direction is about −0.43. The second direction may be a stretching direction, and the first direction may be a direction perpendicular to the stretching direction.

Therefore, as seen from above, after the reliability test of the above-mentioned various situations, the shrinkage rate of the polarizer 4 in the first direction is relatively small, and the shrinkage rate in the first direction does not change much with the increase of time and number of times; and the shrinkage rate of the polarizer 4 in the second direction is relatively large, and the shrinkage rate in the second direction slightly increases with the increase of time and number of times.

At the corners of the polarizer 4, due to the influence of the shrinkage rate in the first direction and the shrinkage rate in the second direction, the shrinkage rate at the corners is the largest.

Figure 10:
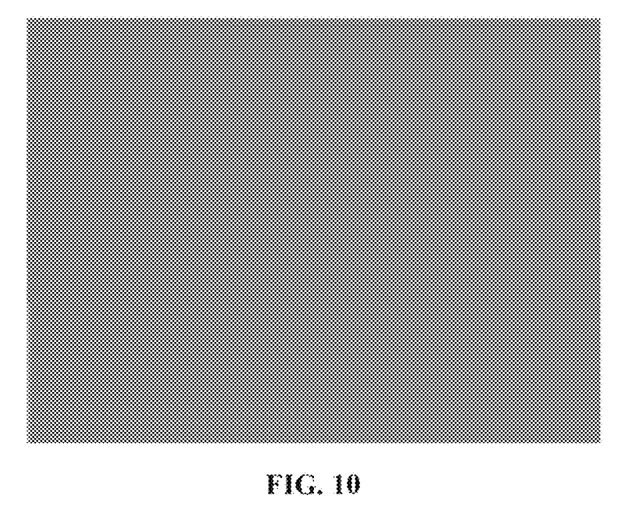
FIG. 10 is a schematic diagram illustrating the display effect of the display panel according to some embodiments of the present disclosure.

Since the shrinkage force in the stretching direction of the polarizer 4 is relatively large, at the corners of the polarizer 4, due to the influence of the shrinkage rate in the stretching direction and the shrinkage rate in the direction perpendicular to the stretching direction, the shrinkage rate at the corners is the largest and a certain angle is formed between the shrinking direction and the stretching direction, so the stretching force on the retardation layer 3 at the corner is also greater. In the display panel, the included angle between the optical axis of the retardation layer 3 and the stretching direction is not equal to 0° and 90°, so that at the corner with the largest shrinkage rate, the included angle between the optical axis of the retardation layer 3 and the shrinking direction decreases. At the other positions, the shrinkage force of the polarizer 4 has a reduced component in the direction of the optical axis of the retardation layer 3, so that the influence of shrinking force on the optical axis of the retardation layer 3 is relatively uniform, thereby alleviating the phenomenon of uneven hue. Referring to FIG. 10, which is a schematic diagram of the display effect of the display panel according to the present disclosure, the display in the this drawing is more uniform than that in FIG. 4.

In some embodiments, a third adhesive layer 53 is provided on one side of the polarizer 4 away from the display substrate 2, and the material of the third adhesive layer 53 may be optical adhesive such as OCA. The thickness of the third adhesive layer 53 is greater than or equal to 0.15 mm. The shrinkage rate of the polarizing layer 42 can be reduced by the third adhesive layer 53 with a great thickness, that is, the shrinkage of the polarizing layer 42 can be suppressed, thereby reducing the stretching effect of the polarizing layer 42 on the retardation layer 3, reducing the change in the optical axis of the retardation layer 3, and alleviating the unevenness of hue caused by the change in the optical axis. In some embodiments, the material of the third adhesive layer 53 may also be PSA.

Figure 11:
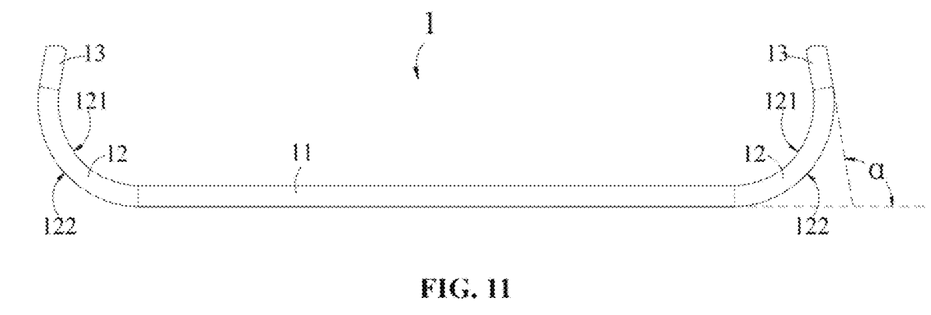
FIG. 11 is a schematic structural diagram of the transparent cover in FIG. 5 according to some embodiments.
Figure 12:
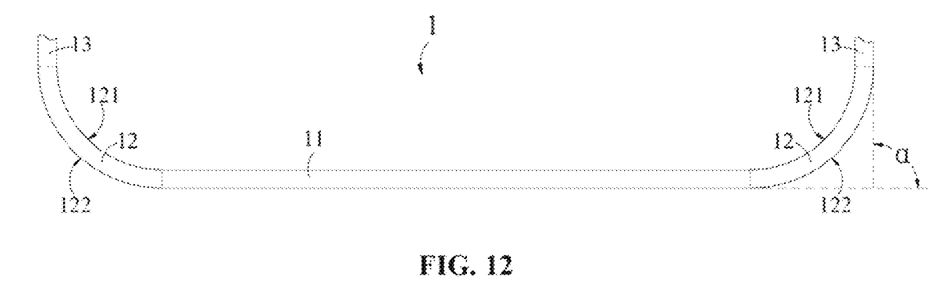
FIG. 12 is a schematic structural diagram of the transparent cover in FIG. 5 according to some other embodiments.

In some embodiments, the transparent cover plate 1 is provided on one side of the third adhesive layer 53 away from the display substrate 2. Referring to FIG. 11 and FIG. 12, the transparent cover 1 may include a flat portion 11 and a bending portion 12, and the flat portion 11 may be configured as a rectangle, that is, the flat portion 11 has two long sides and two short sides. The two short sides of the flat portion 11 are connected in a one-to-one correspondence with two bending portions 12, and the two bending portions 12 may be symmetrical to each other. An extending flat portion 13 may be further connected to one side of the bending portion 12 away from the flat portion 11, and the extending flat portion 13 and the bending portion 12 transition smoothly.

The extension direction of the bending portion 12 is consistent with the extension direction of the short side of the flat portion 11, that is, the extension direction of the bending portion 12 is the extension direction of the edge of the flat portion 11 connected with the bending portion 12.

In some embodiments, according to actual needs, only one edge of the flat portion 11 is connected with the bending portion 12; alternatively, three or four edges of the flat portion 11 are connected in a one-to-one correspondence with three or four bending portions 12. The bending portion 12 extends along the edge of the flat portion 11, the thickness of the flat portion 11 and the bending portion 12 are substantially the same, and the flat portion 11 and the bending portion 12 transition smoothly. The bending angle α may be 80°, 88°, 90°, 110°, 120°, and the like. The bending angle α may be an included angle α between the extension line of the flat portion 11 and a tangent line at the side of the bending portion 12 away from the flat portion 11. The bending angle α may also be an included angle α between the extension line of the flat portion 11 and the extension line of the extending flat portion 13.

The bending portion 12 may have a first bending surface 121 and a second bending surface 122. In some embodiments, on a cross section perpendicular to the extension direction, the curvature radius of the first bending surface 121 may gradually increase from the edges on both sides connected to the flat surface portion 11 and the extending flat surface portion 13 to the middle portion. Similarly, on the cross section perpendicular to the extension direction, the curvature radius of the second bending surface 122 may gradually increase from die edges on both sides connected to the flat surface portion 11 and the extending flat surface portion 13 to the middle portion. In some other embodiments, the curvature radius of the first bending surface 121 may gradually decrease from the edges on both sides connected to the flat surface portion 11 and the extending flat surface portion 13 to the middle portion, and the curvature radius of the second bending surface 122 may gradually decrease from the edges on both sides connected to the flat surface portion 11 and the extending flat surface portion 13 to the middle portion.

In addition, in some other embodiments of the disclosure, the first bending surface 121 may be formed as a circular arc surface, so that the curvature radius of the first bending surface 121 is the same everywhere; the second bending surface 122 may also be formed as a circular arc surface, so that the curvature radius of the second bending surface 122 is the same everywhere. Since the thickness of the bending portion 12 is substantially the same, the curvature radius of the second bending surface 122 may be larger than the curvature radius of the first bending surface 121. The second bending surface 122 is located on one side away from the display assembly. On the cross section perpendicular to the extension direction, the length of a second arc on the second bending surface 122 is greater than the length of a first arc located on the first bending surface 121. In other wards, the first bending surface 121 is located inside the bending portion 12, and the second bending surface 122 is located outside the bending portion 12.

In addition, the first bending surface 121 may be formed as an elliptical arc surface, a parabolic arc surface, and the like. In other wards, the cross section of the first bending surface 121 perpendicular to the extension direction may be an elliptical arc, a parabola, and the like. Similarly, the second bending surface 12 may be formed as an elliptical arc surface, a parabolic arc surface, and the like. In other words, the cross section of the second bending surface 122 perpendicular to the extension direction may be an elliptical arc, a parabola, and the like.

The third adhesive layer 53 is bonded on the flat portion 11 and the inner bent side of the bending portion 12 of the transparent cover 1, and the polarizer 4 is bonded on the flat portion 11 and the inner bent side of the bending portion 12 of the transparent cover through the third adhesive layer 53, so that the two sides of the polarizer 4 also form a bending area matched with the bending portion 12 of the transparent cover 1, and the retardation layer 3 is bonded on one side of the polarizer 4 away from the transparent cover plate 1 through the second adhesive layer 52. The bent transparent cover 1 suppresses the shrinkage of the polarizing layer 42, thereby alleviating the stretching of the polarizing layer 42 on the retardation layer 3, reducing the optical axis change of the retardation layer 3, and reducing the unevenness of hue caused by the optical axis change.

The inner bent side refers to one side of the bending portion 12 where the center of the first bending surface 121 and the center of the second bending surface 122 are located. In the case where the first bending surface 121 and the second bending surface 122 are formed as elliptical arc surfaces or parabolic arc surfaces, the inner bent side may also refer to one side of the bending portion 12 where multiple arc centers of the first bending surface 121 and multiple arc centers of the second bending surface 122 are located. Since the elliptical arc or the parabola may be considered as being formed by multiple circular arcs, an arc center may be considered as a center of a circle to which the arc belongs. The outer bent side refers to the side opposite to the inner bent side.

The material of the transparent cover plate 1 may be glass, and the transparent cover plate 1 may be formed by thermosplastically bending a flat glass. In some embodiments, the material of the transparent cover plate 1 may also be rigid plastic, resin, or the like.

Further, some embodiments of the disclosure further provide a display device, and the display device may include the display panel described in any embodiments as described. The specific structure of the display panel has been described in detail above, and therefore will not be repeated here.

The specific type of the display device is not particularly limited, and any type of display device commonly used in the art can be used, for example, mobile devices such as mobile phones, wearable devices such as watches, VR devices, and the like. The specific use of the device should be selected accordingly, which will not be elaborated here.

It should be noted that in addition to the display panel, the display device also includes other necessary elements and components, taking a mobile phone as an example, such as a casing, a circuit board, a power line, and the like. The specific usage requirements will be supplemented accordingly, which will not be elaborated here.

Compared with the prior art, the beneficial effects of the display device according to some embodiments of the present disclosure are the same as the beneficial effects of the display panel according to some embodiments as described above, which will not be repeated here.

Other embodiments of the present disclosure will readily occur to those skilled in the art upon consideration of the specification and practice of the invention disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, with the scope and spirit of the disclosure being indicated by the appended claims.

What is claimed is:

1. A display panel, comprising:
   a display substrate;
   a first adhesive layer, provided on a side of the display substrate away from the backplane;
   a retardation layer, provided on a side of the first adhesive layer away from the backplane;
   a second adhesive layer, provided on a side of the retardation layer away from the backplane;
   a polarizer, provided on a side of the second adhesive layer away from the backplane, wherein a direction of an absorption axis of the polarizer is parallel or perpendicular to a stretching direction of the polarizer, and an included angle between the absorption axis of the polarizer and an optical axis of the retardation layer is not equal to 0° or 90°;
   a third adhesive layer, provided on a side of the polarizer away from the display substrate; and
   a transparent cover plate, provided on a side of the third adhesive layer away from the display substrate.

2. The display panel according to claim 1, wherein the retardation layer comprises a ¼ λ retardation film.

3. The display panel according to claim 2, wherein the included angle between the optical axis of the ¼ λ retardation film and the absorption axis of the polarizer is 45°.

4. The display panel according to claim 2, wherein the retardation layer further comprises a ½ λ retardation film, and the ½ λ retardation film is provided between the ¼ λ retardation film and the polarizer.

5. The display panel according to claim 4, wherein an included angle between an optical axis of the ¼ λ retardation film and the absorption axis of the polarizer is θ1, and an included angle between an optical axis of the ½ λ retardation film and the absorption axis of the polarizer is θ2; where θ1 is greater than or equal to 10° and less than or equal to 20°, and θ2 is greater than or equal to 70° and less than 90°; or θ1 is greater than or equal to 70° and less than 90°, and θ2 is greater than or equal to 10° and less than or equal to 20°.

6. The display panel according to claim 5, wherein θ1 is 15°, and θ2 is 75°; or θ1 is 75°, and θ2 is 15°.

7. The display panel according to claim 1, wherein a thickness of the third adhesive layer is greater than or equal to 0.15 mm.

8. The display panel according to claim 1, wherein the transparent cover plate comprises:
   a flat portion; and
   a bending portion, connected to two opposite side edges of the flat portion and smoothly transitioning with the flat portion.

9. The display panel according to claim 8, wherein the third adhesive layer, the polarizer and the retardation layer are sequentially stacked on a side of the flat portion and an inside of the bending portion.

10. The display panel according to claim 1, wherein the polarizer comprises:
    a polarizing layer, provided on a side of the retardation layer away from the display substrate; and a first protective layer, provided on a side of the polarizing layer away from the display substrate.

11. The display panel according to claim 10, wherein the polarizer further comprises:
a second protective layer, provided between the retardation layer and the polarizing layer.

12. A display device comprising a display panel, wherein the display panel comprises:
a display substrate;
a first adhesive layer, provided on a side of the display substrate away from the backplane;
a retardation layer, provided on a side of the first adhesive layer away from the backplane;
a second adhesive layer, provided on a side of the retardation layer away from the backplane;
a polarizer, provided on a side of the second adhesive layer away from the backplane, wherein a direction of an absorption axis of the polarizer is parallel or perpendicular to a stretching direction of the polarizer, and an included angle between the absorption axis of the polarizer and an optical axis of the retardation layer is not equal to 0° or 90°;
a third adhesive layer, provided on a side of the polarizer away from the display substrate; and
a transparent cover plate, provided on a side of the third adhesive layer away from the display substrate.

13. The display device according to claim 12, wherein the retardation layer comprises a ¼ λ retardation film.

14. The display device according to claim 13, wherein the included angle between the optical axis of the ¼ λ retardation film and the absorption axis of the polarizer is 45°.

15. The display device according to claim 13, wherein the retardation layer further comprises a ½ λ retardation film, and the ½ λ retardation film is provided between the ¼ λ retardation film and the polarizer.

16. The display device according to claim 15, wherein an included angle between an optical axis of the ¼ λ retardation film and the absorption axis of the polarizer is θ1, and an included angle between an optical axis of the ½ λ retardation film and the absorption axis of the polarizer is θ2; where θ1 is greater than or equal to 10° and less than or equal to 20°, and θ2 is greater than or equal to 70° and less than 90°; or θ1 is greater than or equal to 70° and less than 90°, and θ2 is greater than or equal to 10° and less than or equal to 20°.

17. The display device according to claim 16, wherein θ1 is 15°, and θ2 is 75°; or θ1 is 75°, and θ2 is 15°.

18. A display panel, comprising:
a display substrate;
a first adhesive layer, provided on a side of the display substrate away from a backplane;
a retardation layer, provided on a side of the first adhesive layer away from the backplane;
a second adhesive layer, provided on a side of the retardation layer away from the backplane;
a polarizer, provided on a side of the second adhesive layer away from the backplane, wherein the polarizer exerts a stretching force on the retardation layer, at a corner of the polarizer, an included angle between a direction of the stretching force and a stretching direction of the polarizer is not equal to 0° or 90°; a direction of an absorption axis of the polarizer is parallel or perpendicular to the stretching direction of the polarizer, an included angle between the absorption axis of the polarizer and an optical axis of the retardation layer is not equal to 0° or 90°, and an included angle between the stretching direction of the polarizer and the optical axis of the retardation layer is not equal to 0° or 90°; at the corner of the polarizer, an included angle between the direction of the stretching force and the optical axis of the retardation layer decreases; and at a non-corner region of the polarizer, the stretching force has a reduced component in a direction of the optical axis of the retardation layer;
a third adhesive layer, provided on a side of the polarizer away from the display substrate; and
a transparent cover plate, provided on a side of the third adhesive layer away from the display substrate.

* * * * *